(12) United States Patent
Tetart

(10) Patent No.: US 7,704,603 B2
(45) Date of Patent: Apr. 27, 2010

(54) AQUEOUS SOLUTION OF PHENOLIC COMPOUND-FORMALDEHYDE-AMINOALCOHOL RESIN, PREPARATION METHOD, MINERAL FIBER SIZING COMPOSITIONS CONTAINING SAID RESIN AND RESULTING PRODUCTS

(75) Inventor: Serge Tetart, Saint-Maximin (FR)

(73) Assignee: Saint Gobain Isover, Courbevoie (FR)

( * ) Notice: Subject to any disclaimer, the term of this patent is extended or adjusted under 35 U.S.C. 154(b) by 19 days.

(21) Appl. No.: 10/522,188

(22) PCT Filed: Jul. 23, 2003

(86) PCT No.: PCT/FR03/02326

§ 371 (c)(1),
(2), (4) Date: Dec. 9, 2005

(87) PCT Pub. No.: WO2004/011519

PCT Pub. Date: Feb. 5, 2004

(65) Prior Publication Data

US 2006/0128888 A1    Jun. 15, 2006

(30) Foreign Application Priority Data

Jul. 25, 2002    (FR) ................... 02 09727

(51) Int. Cl.
| | |
|---|---|
| A01K 1/015 | (2006.01) |
| B64F 1/26 | (2006.01) |
| B32B 3/00 | (2006.01) |
| B32B 5/00 | (2006.01) |
| B32B 5/14 | (2006.01) |
| B32B 7/00 | (2006.01) |
| C08F 283/00 | (2006.01) |
| C08F 292/00 | (2006.01) |
| C08G 8/28 | (2006.01) |
| C08G 14/08 | (2006.01) |
| B32B 17/12 | (2006.01) |
| B32B 18/00 | (2006.01) |
| B32B 27/00 | (2006.01) |
| C08K 3/34 | (2006.01) |
| C08L 61/00 | (2006.01) |
| D02G 3/00 | (2006.01) |
| D06N 7/00 | (2006.01) |
| E04B 1/82 | (2006.01) |
| E04H 17/00 | (2006.01) |
| G11B 5/64 | (2006.01) |
| G10K 11/00 | (2006.01) |
| E04B 1/84 | (2006.01) |
| E04B 9/00 | (2006.01) |
| E04B 2/02 | (2006.01) |
| C08L 61/06 | (2006.01) |

(52) U.S. Cl. .............. 428/378; 181/210; 181/284; 181/290; 181/291; 181/294; 428/98; 428/141; 428/142; 428/171; 428/172; 428/221; 428/294.1; 428/394; 524/444; 524/452; 524/596; 525/480; 525/504; 525/508

(58) Field of Classification Search .............. 524/444, 524/452, 596; 525/480, 504, 508; 428/98, 428/141, 142, 171, 172, 221, 294.1, 378; 181/210, 284, 290, 291, 294
See application file for complete search history.

(56) References Cited

U.S. PATENT DOCUMENTS

| | | | |
|---|---|---|---|
| 3,876,405 | A | 4/1975 | Eilerman |
| 4,146,512 | A | 3/1979 | Weaver et al. |
| 4,282,330 | A | 8/1981 | Austin |
| 4,525,488 | A * | 6/1985 | Cuscurida et al. ........... 521/164 |
| 5,270,434 | A | 12/1993 | Tetart et al. |
| 5,340,903 | A | 8/1994 | Tetart et al. |
| 6,395,819 | B1 | 5/2002 | Espiard et al. |

FOREIGN PATENT DOCUMENTS

| | | |
|---|---|---|
| EP | 1 081 209 | 3/2001 |
| WO | WO 01/23655 A1 * | 4/2001 |

* cited by examiner

*Primary Examiner*—Patrick D Niland
(74) *Attorney, Agent, or Firm*—Oblon, Spivak, McClelland, Maier & Neustadt, L.L.P.

(57) ABSTRACT

The present invention relates to a liquid resin intended more particularly for the sizing of mineral fibers which exhibits a dilutability in water at 20° C. at least equal to 1 000% and a level of free formaldehyde preferably of less than 0.4%, expressed as total weight of liquid, this resin being characterized in that it is composed essentially of condensates obtained from a phenolic compound, from formaldehyde and from an aminoalcohol according to the Mannich reaction.

The invention also relates to a sizing composition including said resin, to the mineral fibers sized by means of this composition and to the products formed from the mineral fibers, in particular for thermal and/or sound insulation.

25 Claims, No Drawings

AQUEOUS SOLUTION OF PHENOLIC COMPOUND-FORMALDEHYDE-AMINOALCOHOL RESIN, PREPARATION METHOD, MINERAL FIBER SIZING COMPOSITIONS CONTAINING SAID RESIN AND RESULTING PRODUCTS

The present application is a national stage application of International Application No. PCT/FR03/02326, filed on Jul. 23, 2003, which published as WO 04/011519 on Feb. 5, 2004, and claims priority to French Application No. 02/09727, filed on Jul. 25, 2002, the entire contents of which are hereby incorporated by reference.

The present invention relates to the field of resins to be used for the preparation of sizing compositions for mineral fibers. More specifically, it relates to the preparation of a resin formed by condensation of a phenolic compound, of formaldehyde and of an aminoalcohol, to the aqueous sizes comprising such a resin and to the products based on mineral fibers formed by means of these sizes.

Phenolic resins are included among thermosetting resins capable of forming a three-dimensional network and, as such, they are often used as base constituents of compositions for sizing mineral fibers, which fibers make it possible to manufacture thermal and acoustic insulators, tissue mats of glass fibers and soilless culture substrates.

The sizing composition is applied to fibers which can be obtained by various processes, for example according to the known technique of internal or external centrifugal fiberizing. Internal centrifuging consists in introducing the molten material (generally glass or rock) into a spinner comprising a multitude of small orifices, the material being thrown towards the peripheral wall of the spinner under the action of the centrifugal force and escaping therefrom in the form of filaments. At the outlet of the spinner, the filaments are drawn and entrained by a gas stream having a high temperature and a high velocity to a receiving member to form a blanket of fibers.

In order to ensure that the fibers are assembled together, the sizing composition comprising the thermosetting resin is sprayed onto the fibers at the outlet of the spinner. The blanket of fibers, the fibers being coated with the size, is subjected to a heat treatment (at a temperature of greater than 100° C.) in order to polycondense the resin and thus to obtain a cured product having the properties required to form a thermal and/or sound insulation product, in particular a dimensional stability, a tensile strength, a thickness recovery after compression and a homogeneous color.

The sizing composition intended to be sprayed over the fibers is composed of the resin, which is generally provided in the form of an aqueous solution, to which a catalyst and optionally additives playing a specific role (lubrication, reduction of dust, viscosity regulation, and the like) are added.

Among phenolic resins, those which belong to the resol family are particularly desired as, in addition to being capable of crosslinking under the action of heat, they are very soluble in water, have a good affinity for mineral fibers, in particular glass fibers, and are relatively inexpensive.

The properties desired for the sizing composition depend essentially on the characteristics of the resin. From the viewpoint of the application, the sizing composition has to have a good ability to be sprayed, has to be able to be deposited at the surface of the fibers and has to be able to bind them to one another. The ability to be sprayed is directly related to the ability which the resin has to be able to be diluted in a large amount of water. This ability to be diluted is characterized by the "dilutability", which is defined as being the volume of deionized water which it is possible, at a given temperature, to add to a unit of volume of the aqueous resin solution before the appearance of a permanent haze. It is generally considered that a resin is capable of being used as a size when its dilutability is equal to or greater than 1 000% at 20° C. for at least 8 days or better still equal to or greater than 2 000% (infinite dilutability).

The aim is increasingly to obtain compositions which also satisfy environmental and toxicological requirements, that is to say compositions which comprise or generate as little as possible in the way of undesirable gases or of products which can affect human health.

In this respect, phenolic resins of resol type are not entirely satisfactory. They are obtained by condensation, in a basic medium, of phenol and of excess formaldehyde and consequently the residual content of starting materials, in particular of formaldehyde, is generally high.

To keep this content within acceptable limits, it is known to add, to the resin, a sufficient amount of urea which reacts with the free formaldehyde with the formation of urea/formaldehyde condensates (see EP-A-0 148 050). A resin including phenol/formaldehyde and urea/formaldehyde condensates is thus obtained which has a content of free formaldehyde of approximately 3% and a relatively low level of free phenol, a level sufficiently low for the resin to be described as not generating gaseous emissions which attack the environment. However, an excess of urea remains in the resin, which urea is converted to ammonia in the subsequent treatment step targeted at carrying out the polycondensation, thus contributing to increasing the amount of undesirable gases in the effluents. In addition, urea/formaldehyde condensates are not very stable thermally and are decomposed to formaldehyde and urea during the same polycondensation stage. Another disadvantage is that urea/formaldehyde condensates are not very soluble in water, which necessitates storing the resin at a low temperature (of the order of 14-16° C.) in order to prevent them from crystallizing and forming deposits which might block the pipes for transferring and the nozzles for spraying the size.

EP-A-0 480 778 provided for reducing the content of free phenol and of free formaldehyde by substituting, for urea, an amine which reacts with the residual phenol and the residual formaldehyde according to the Mannich reaction, to form a condensation product possessing improved thermal stability. The content of free formaldehyde in this resin is less than 0.5%.

The resins which have just been described are all obtained by first reacting the phenol and the formaldehyde to form phenol/formaldehyde condensates and then, in a following stage, by condensing the unreacted formaldehyde and, if appropriate, the unreacted phenol with the urea or the amine. Consequently, the resin is essentially composed of phenol/formaldehyde condensates comprising methylol groups. As already indicated, the fibers coated with the size are brought to a temperature of greater than 100° C. in order to carry out the crosslinking. Under the effect of the temperature, the methylol groups of the resin react together or with the residual phenol to form methylene bridges or are decomposed, which in all cases is reflected by the release of formaldehyde and thus by an increase in undesirable gases.

A subject matter of the present invention is a novel resin which exhibits satisfactory characteristics in order to be able to be used in a sprayable sizing composition and which has a low ability to produce undesirable gaseous emissions, in particular with regard to formaldehyde, namely that the resin has a low content of free formaldehyde and that, in addition, it does not allow it to be released therefrom during the treatment of the fibers targeted at crosslinking a size which coats them.

Another subject matter of the invention is a process for manufacturing the resin from a phenolic compound, formaldehyde and an aminoalcohol which does not require the use of urea or an amine to reduce the content of free formaldehyde.

Another subject matter of the invention is a sizing composition comprising said resin, its use for sizing mineral fibers for the purpose of forming thermal and/or sound insulation products and the products thus obtained.

The liquid resin according to the invention intended to be used in a sizing composition for mineral fibers essentially comprises phenolic compound/formaldehyde/aminoalcohol condensates. The resin exhibits a level of free formaldehyde preferably of less than 0.4% of the total weight of the resin. It has a dilutability, measured at 20° C., at least equal to 1 000% and, furthermore, comprises a content of free phenol of less than 0.02% of the total weight of the resin. In addition, the resin is thermally stable, that is to say that it is virtually devoid of methylol groups capable of generating formaldehyde under the crosslinking conditions applied to the fibers coated with the sizing composition.

To evaluate the thermal stability, the sizing composition comprising the resin is subjected to a test which simulates the thermal conditions imposed for the manufacture of an insulating product as described above. The resin is regarded as thermally stable and not very likely to release undesirable gases if the amount of formaldehyde released is less than or equal to 5 g per 1 kg of dry matter of a 26.6% by weight sizing solution in water.

According to the invention, the resin is formed by a Mannich reaction which proceeds by condensation of a phenolic compound, of formaldehyde and of an aminoalcohol.

The phenolic compound can, for example, be phenol, a cresol, such as o-cresol, m-cresol or p-cresol, resorcinol and mixtures of these compounds. Phenol is preferred.

The aminoalcohol in accordance with the invention is chosen from the compounds corresponding to the following formula:

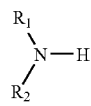

in which $R_1$ and $R_2$, which are identical or different, represent H or a linear or branched $C_1$-$C_{10}$, preferably $C_2$-$C_5$, hydrocarbonaceous chain which can include one or more unsaturations and one or more OH radicals, at least one of $R_1$ or $R_2$ including at least one OH radical.

The OH radical is preferably carried by the terminal carbon atom of the hydrocarbonaceous chain and, preferably, each $R_1$ and $R_2$ radical carry a hydroxyl functional group on the terminal carbon of the hydrocarbonaceous chain. The total number of OH radicals advantageously does not exceed 8.

Mention may be made, as examples of such aminoalcohols, of monoethanolamine and diethanolamine. Monoethanolamine is preferred.

To obtain the resin as defined above, the invention provides a process which consists in reacting the phenolic compound simultaneously with the formaldehyde and the aminoalcohol in a formaldehyde/phenolic compound molar ratio of greater than 1 and cooling the reaction mixture. The invention is characterized in that the formaldehyde and the aminoalcohol are reacted simultaneously, and advantageously gradually, with the phenolic compound, which makes it possible to better control the release of heat related to the exothermic nature of the condensation reaction.

More particularly, the formaldehyde, the aminoalcohol and the phenolic compound are reacted in a formaldehyde/phenolic compound and aminoalcohol/phenolic compound molar ratio of between 2 and 3, preferably equal to approximately 3, until a degree of conversion of the phenolic compound of at least 99% is obtained. The degree of conversion of the phenolic compound is the percentage of phenolic compound which has participated in the phenolic compound/formaldehyde/aminoalcohol condensation reaction with respect to 100% of the starting phenolic compound.

The condensation reaction is subsequently stopped, by cooling the reaction mixture, at a stage which corresponds to a resin having a dilutability of greater than 1 000% and generally of greater than 2 000%.

According to the invention, the addition of the formaldehyde and of the aminoalcohol to the phenolic compound is carried out simultaneously and advantageously gradually. The formaldehyde and the aminoalcohol are preferably introduced separately but it is also possible to add them as a mixture. In this case, it is recommended to operate at a relatively low temperature in order to prevent the compounds from being able to react with one another before coming into contact with the phenolic compound.

The reaction according to the invention between the phenolic compound, the aldehyde and the aminoalcohol is carried out quasistoichiometrically, which makes it possible to achieve particularly low residual contents of formaldehyde and phenol. Consequently, it is therefore no longer necessary to trap the excess phenolic compound and/or formaldehyde with urea or an amine.

Whatever the formaldehyde/phenolic compound molar ratio used, the resin has a content of free formaldehyde which remains less than 0.4%, preferably less than 0.25%, and a content of free phenol of less than 0.02%, preferably of less than 0.01%, with respect to the liquid resin. This is rendered possible by the fact that the introduction of the formaldehyde and the aminoalcohol is carried out gradually, thus making it possible to have a particularly high degree of conversion of phenolic compound and to reduce in proportion the amount of free phenolic compound in the final resin.

The condensation reaction does not require a catalyst, which is a considerable advantage in comparison with conventional resols, which require the addition of a base and which base subsequently has to be neutralized with an acid at the end of the reaction in order to prevent the resin from changing over time. The salts formed, in particular when they comprise Na, are known to reduce the resistance to aging of the products formed from fibers sized with this type of resin. In the invention, because it is not necessary to use an inorganic catalyst, the resin exhibits a very low level of ash, generally of less than 0.04% by weight with respect to the dry resin or of less than 0.02% with respect to the liquid resin.

More particularly, the resin is prepared according to a temperature cycle which is divided schematically into three steps: a heating step, a step comprising a temperature stationary phase and a cooling step.

In the first stage, the phenolic compound is reacted simultaneously with the formaldehyde and the aminoalcohol while gradually heating the reaction mixture to a temperature of between 60 and 100° C. and preferably equal to approximately 75° C., the formaldehyde/phenolic compound and aminoalcohol/phenolic compound molar ratios/advantageously being between 2 and 3 and preferably of the order of approximately 3.

During the second step (temperature stationary phase), the temperature of the reaction medium reached during the first step is maintained until a degree of conversion of the phenolic compound is obtained which is at least equal to 99%, corresponding to an infinite dilutability (greater than 2 000%). The duration of this stationary phase is preferably of the order of 100 to 200 minutes.

The third, cooling, step is carried out so that the temperature of the reaction mixture reaches 20 to 25° C. In the present case, the rate of cooling is not critical and can, for example, be 1° C. per minute.

The resin obtained is composed essentially of phenolic compound/formaldehyde/aminoalcohol condensates. The term "essentially" should be understood to mean that the phenolic compound/formaldehyde/aminoalcohol condensates represent at least 70% of the total weight of the resin, calculated on the basis of the dry resin, preferably at least 90%.

Another subject matter of the invention is a sizing composition intended to coat mineral fibers, in particular glass or rock fibers, and the sized fibers obtained, these fibers being used more particularly to manufacture insulation products.

The sizing composition comprises the resin according to the invention, an agent which makes crosslinking possible, and optionally additives.

The sizing composition according to the invention comprises, expressed as parts of dry matter, from 18 to 65 parts by weight of resin and from 10 to 82 parts by weight of crosslinking agent.

In the context of the invention, the crosslinking agent is a compound including at least two functional groups capable of reacting with the amine functional groups or the hydroxyl functional groups of the resin. Mention may be made, as examples, of formaldehyde, amines, such as HMTA, acids, such as phthalic acid, isophthalic acid, terephthalic acid or citric acid, poly(carboxylic or acrylic acid)s of high molecular mass, of the order of 500, preferably between 1 000 and 5 000, the anhydrides of these acids and the mixtures of these compounds. Use is preferably made of citric acid and/or a phthalic, isophthalic or terephthalic anhydride.

The sizing composition generally comprises the following additives, per 100 parts by weight of dry matter of resin and of crosslinking agent:

0 to 20 parts of an oil, preferably 6 to 15 parts, 0 to 2 parts of a silane, preferably of the order of 0.4 part.

The role of the various constituents of the sizing composition is well known and is only briefly restated here:

the water has a lubricating role, makes it possible to adjust the viscosity and, during the spraying, makes it possible to cool the fibers and to limit pregelling phenomena, the oil provides lubrication of the fibers, makes it possible to reduce the dust which may be generated during the handling of the finished products (insulating blankets, for example) and improves the feeling to the touch. The oil is generally chosen from oils which are inert with respect to the other constituents, as an emulsion in water, or which can be emulsified, the silane provides the binding between the mineral fiber and the resin, which makes it possible to strengthen the mechanical properties, and improves the resistance to aging. The silanes are generally aminosilanes.

The silane is advantageously an aminosilane, in particular γ-aminopropyltriethoxysilane, sold under the reference Silques® A1100 by Crompton. The oil, for its part, is composed of hydrocarbons extracted from oil, especially alkanes, such as the oil Mulrex® 88 sold by Mobil Oil.

The products obtained from the abovementioned fibers also constitute a subject matter of the invention. As indicated above, these products can take the form of a blanket or of a tissue mat of mineral fibers and they are formed by forming a blanket of mineral fibers bonded to one another by the size which, in its crosslinked form, is solid, cannot melt and is insoluble in water.

The tissue mat of mineral fibers, in particular of glass fibers, generally has a weight per unit area of between 10 and 300 g/m² and it preferably comprises at least 1%, indeed even at least 2% and even more than 4%, by weight of size. Although it can be used alone, the tissue mat is more particularly intended to be positioned over at least one external face of an insulating blanket as described above.

These products are intended in particular to form thermal and acoustic insulators, in particular for the construction industry and for domestic ovens, and soilless culture substrates.

The following nonlimiting examples make it possible to illustrate the invention.

EXAMPLE 1

198.1 g of 99.8% phenol (2.10 mol) are introduced into a 2 liter reactor equipped with a stirring system, a condenser, a thermometer and inlets for the reactants which is maintained at 45° C. 127.75 g of a 37% aqueous formaldehyde solution (1.57 mol) and 97.03 g of 99% monoethanolamine (1.57 mol) are introduced simultaneously over 30 minutes using 2 metering pumps. During this period, the temperature is steadily raised to reach 55° C.

The same amount of formaldehyde and of monoethanolamine is again introduced over 30 minutes using the 2 metering pumps while steadily raising the temperature to 75° C.

The reactor is maintained at this temperature for a period of 60 minutes, during which 255.75 g of formaldehyde (3.15 mol) and 194 g of monoethanolamine (3.14 mol) are added via the metering pumps. The reaction mixture is maintained at this temperature for an additional 80 minutes and then it is cooled. When the temperature reaches approximately 25° C., the resin is recovered in the form of a clear aqueous solution having an infinite dilutability. After storing at 20° C. for 8 days, the resin solution has a content of free phenol of less than 0.01%, a content of free formaldehyde of less than 0.25%, an infinite dilutability at 20° C. and a content by weight of solids of 53.3%.

It should be specified that the formaldehyde and phenol values indicated correspond to the detection threshold of the analytical methods used to quantitatively determine the compounds in question.

The emission test for undesirable gases employed to assess the release of formaldehyde, of phenol and of ammonia is carried out in the following method way:

A composition comprising 75 g of the liquid resin obtained above (i.e. 40 g of dry resin), 60 g of anhydrous citric acid and 241 g of water is prepared.

3.76 g of this composition (26.6% content by weight of solids) are placed in an oven at 180° C. for 1 hour while flushing with air (1 l/min). The vapors which are given off are directed toward 2 spargers in series containing water. The formaldehyde, the phenol and the ammonia trapped are quantitatively determined by spectrocolorimetry.

Per 1 kg of dry matter, the amount of formaldehyde given off is equal to 1.9 g, the amount of total phenol is equal to 0.24 g and the amount of ammonia is equal to 0.17 g.

EXAMPLE 2 a) Preparation of the Resin 28.3 kg of 99.8% phenol (300.11 mol) are introduced into a reactor and the mixture is heated to 30-35° C. 73 kg of a 37% aqueous formaldehyde solution (899.43 mol) and 55.45 kg of 99% monoethanolamine (898.75 mol) are mixed in an appropriate container and the mixture is introduced into the reactor over 189 minutes. The formaldehyde/phenol and monoethanolamine/phenol molar ratio is equal to 2.99.

Immediately after the end of the introduction of the reactants, the temperature of the reaction mixture is adjusted to 30-35° C. over 3 hours and then the cooling of the mixture is begun.

A liquid resin is recovered which exhibits, after storage at 20° C. for 40 days, an infinite dilutability, a content of free phenol of less than 0.01%, a content of free formaldehyde of less than 0.25% and a content by weight of solids of 50%.

b) Sizing Composition

A sizing composition capable of coating mineral fibers formed by centrifugal drawing is prepared by mixing the following constituents (as parts by weight of dry matter):

75 g of resin under a)
60 g of anhydrous citric acid
19 g of oil (Mulrex® 88; 50% of dry matter)
15 g of silane (Silquest® A1100; 2% of dry matter)
934 g of water.

The content sizing composition has a content of dry matter of 10%. It remains stable for several days.

EXAMPLE 3 (COMPARATIVE)

a) Preparation of the Resin 852.2 g of a 37% aqueous formaldehyde solution (10.5 mol) are added to 282.9 g of 99.8% phenol (3 mol) in a reactor equipped in the same way, i.e. a phenol/formaldehyde molar ratio of 3.5. As in example 1, the mixture is heated to approximately 45° C. and then 33.88 g of a 50% aqueous sodium hydroxide solution are added over 30 minutes (i.e. 0.423 mol and an NaOH/initial phenol ratio by weight of 6%). The mixture is subsequently heated to 70° C. over 30 minutes and the temperature is maintained for 80-90 minutes until a degree of conversion of the phenol of 97.9% is obtained. 211.7 g of urea in granular form (i.e. a urea/initial phenol ratio by weight of 0.75) are then added over 25 minutes and the mixture is then gradually cooled to 20° C. and simultaneously neutralized to pH 7.3 by addition of a 15% sulfuric acid solution.

The resin is provided with the appearance of a clear aqueous composition having an infinite dilutability in water at 20° C. after storage at 16° C. for 6 days. The level of free phenol and free formaldehyde is respectively 0.45% and 0.3%.

The resin is subjected to the emission test for undesirable gases described in example 1. For this, a composition comprising 100 [lacuna] of resin, 27 g of urea, 0.7 g of ammonium sulfate and 3.6 g of a 20% aqueous ammonia solution is prepared.

Per 1 kg of dry matter, the amount of formaldehyde given off is equal to 2 g, the amount of free phenol is equal to 5 g and the amount of ammonia is equal to 15 g.

b) Sizing Composition

As in example 1, a sizing composition comprising 10% by weight of dry matter is prepared by mixing:

100 g of resin under a)
27 g of urea
3.5 g of a 20% aqueous ammonium sulfate solution
3.6 g of a 20% aqueous ammonia solution
19 g of oil (Mulrex® 88; 50% of dry matter)
15 g of silane (Silquest® A1100; 2% of dry matter)
552 g of water.

The sizing composition is stable for several hours.

Compared with the conventional composition based on phenol/formaldehyde resin of example 3, the sizing composition comprising the resin according to the invention makes it possible to obtain markedly lower levels of release of phenol and of ammonia, and the level of formaldehyde being slightly lower. The reduction in the content of phenol is 95.2% and the reduction in the content of ammonia is 98.8% with respect to said standard composition.

When the sizing composition according to example 2 is sprayed over mineral fibers under conventional conditions for the purpose of forming insulating blankets intended in particular for thermal and/or sound insulation, it is observed that the mechanical properties, in particular the tensile strength and the thickness recovery, are comparable to those obtained with the conventional size based on phenol/formaldehyde resin of example 3.

In addition, it should be pointed out that, while all the resins according to the invention can be used in sizes for insulating products, they can be used with advantage to form soilless culture substrates. For this application, the plant is placed on the substrate impregnated with a nutrient solution and it is necessary for the release of formaldehyde and phenol to be as low as possible, these being toxic to the plant. The resin according to the invention meets these requirements, the level of free formaldehyde being less than 0.4% and the level of phenol remaining below 0.02%, as indicated above.

The invention claimed is:

1. A product, comprising mineral fibers that have been coated with a sizing composition, wherein:
    the sizing composition comprises a liquid resin and a crosslinking agent;
    the sizing composition comprises from 18 to 65 parts by weight of the liquid resin expressed as parts of dry matter;
    the sizing composition comprises from 10 to 82 parts by weight of the crosslinking agent expressed as parts of dry matter;
    the liquid resin exhibits a dilutability in water at 20° C. at least equal to 1,000%;
    the liquid resin comprises at least 70% by weight of condensates obtained by reacting a phenolic compound simultaneously with formaldehyde and an aminoalcohol according to the Mannich reaction;
    the mineral fibers comprise glass or rock; and
    the product is selected from the group consisting of (1) a tissue mat of the mineral fibers and having a weight per unit area of between 10 and 300 g/m$^2$, (2) a thermal and/or sound insulation product obtained by forming a blanket of the sized mineral fibers, and (3) the thermal and/or sound insulation product having the tissue mat positioned over at least one of its external faces.

2. The product as claimed in claim 1, wherein the phenolic compound is phenol, a cresol, resorcinol or a mixture of these compounds.

3. The product as claimed in claim 1, wherein the aminoalcohol is selected from the group consisting of the compounds of formula

wherein $R_1$ and $R_2$, which are identical or different, represent H or a linear or branched $C_1$-$C_{10}$ hydrocarbonaceous chain which can comprise one or more unsaturations and one or more OH radicals, at least one of $R_1$ or $R_2$ comprising at least one OH radical.

4. The product as claimed in claim 3, wherein the OH radical is carried by the terminal carbon atom of the hydrocarbonaceous chain.

5. The product as claimed in claim 4, wherein the aminoalcohol is monoethanolamine or diethanolamine.

6. The product as claimed in claim 1, wherein the resin exhibits a level of free formaldehyde of less than 0.4%.

7. The product as claimed in claim 1, wherein the resin exhibits a level of free phenolic compound of less than 0.02%.

8. The product as claimed in claim 1, wherein the resin exhibits a level of free formaldehyde of less than 0.25%, a level of free phenolic compound of less than 0.01% and an infinite dilutability.

9. The product as claimed in claim 1, wherein the resin exhibits a level of ash of less than 0.04% by weight of dry resin.

10. A process for the preparation of a liquid resin exhibiting a dilutability in water at 20° C. at least equal to 1,000%, comprising at least 70% by weight of condensates obtained from a phenolic compound, formaldehyde and an aminoalcohol according to the Mannich reaction the method comprising:
   reacting a phenolic compound, formaldehyde and an aminoalcohol according to the Mannich reaction in a formaldehyde/phenolic compound molar ratio of greater than 1, the formaldehyde and the aminoalcohol being reacted simultaneously with the phenolic compound, and
   cooling the reaction mixture,
   wherein the formaldehyde and amino alcohol are introduced into the phenolic compound after having been mixed beforehand.

11. The product as claimed in claim 1, wherein the crosslinking agent is a compound comprising at least two functional groups capable of reacting with the amine functional groups or the hydroxyl functional groups of the resin.

12. The product as claimed in claim 11, wherein the crosslinking agent is formaldehyde, an amine, an acid, an anhydride of the acid or a mixture of these compounds.

13. The product as claimed in claim 1, which is (1) a tissue mat of mineral fibers.

14. The product of claim 1, which is (2) a thermal and/or sound insulation product.

15. The product of claim 1, which is (3) said thermal and/or sound insulation product comprising said fiber tissue mat positioned over at least one of its external faces.

16. The product of claim 1, wherein the sizing composition comprises 6 to 15 parts by weight of an oil and 0.4 to 2 parts by weight of a silane based on 100 parts by weight of dry matter of the liquid resin and the crosslinking agent.

17. The process as claimed in claim 10, wherein the phenolic compound is phenol, a cresol, resorcinol or a mixture of these compounds.

18. The process as claimed in claim 10, wherein the aminoalcohol is selected from the group consisting of the compounds of formula

wherein $R_1$ and $R_2$, which are identical or different, represent H or a linear or branched $C_1$-$C_{10}$ hydrocarbonaceous chain which can comprise one or more unsaturations and one or more OH radicals, at least one of $R_1$ or $R_2$ comprising at least one OH radical.

19. The process as claimed in claim 18, wherein the OH radical is carried by the terminal carbon atom of the hydrocarbonaceous chain.

20. The process as claimed in claim 19, wherein the aminoalcohol is monoethanolamine or diethanolamine.

21. The process as claimed in claim 10, wherein reacting the phenolic compound, formaldehyde and the aminoalcohol comprises reacting in the absence of a catalyst.

22. The process as claimed in claim 10, wherein reacting the phenolic compound, formaldehyde and the aminoalcohol comprises a heating phase and a stationary temperature phase.

23. The process as claimed in claim 22, wherein the heating phase comprises heating the reaction mixture to a temperature of between 60 and 100° C.

24. The process as claimed in claim 22, wherein the stationary temperature phase comprises maintaining a reaction temperature until a degree of conversion of the phenolic compound is 99% or more.

25. The process as claimed in claim 10, wherein a molar ratio of aminoalcohol to phenolic compound is between 2 and 3.

* * * * *